June 24, 1930.　　　　E. A. THOMPSON　　　　1,768,346
DISK CLUTCH
Filed June 20, 1927　　　3 Sheets-Sheet 1

Inventor
Earl A. Thompson
By Blackmore, Spencer & Hulse
Attorneys

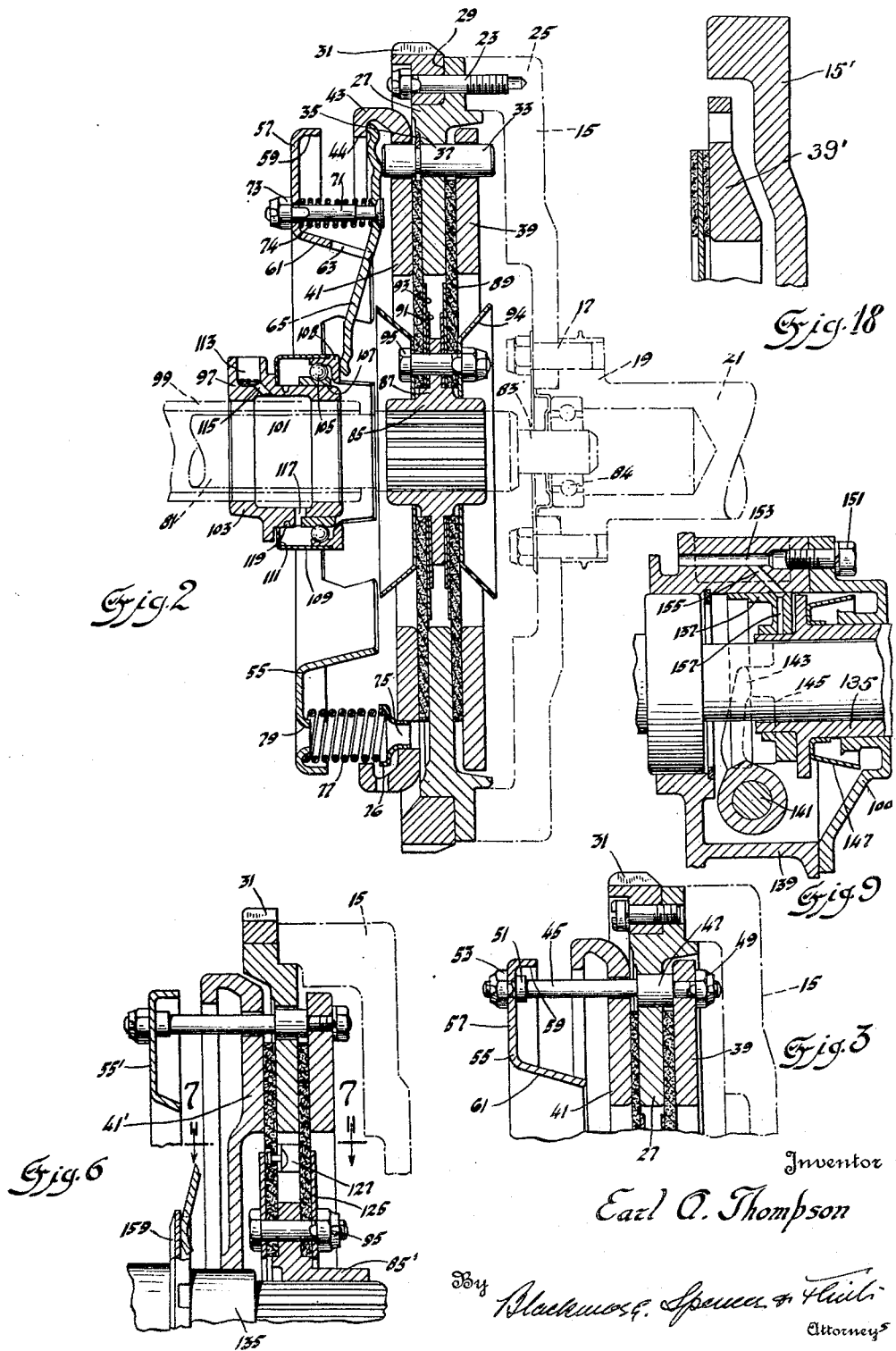

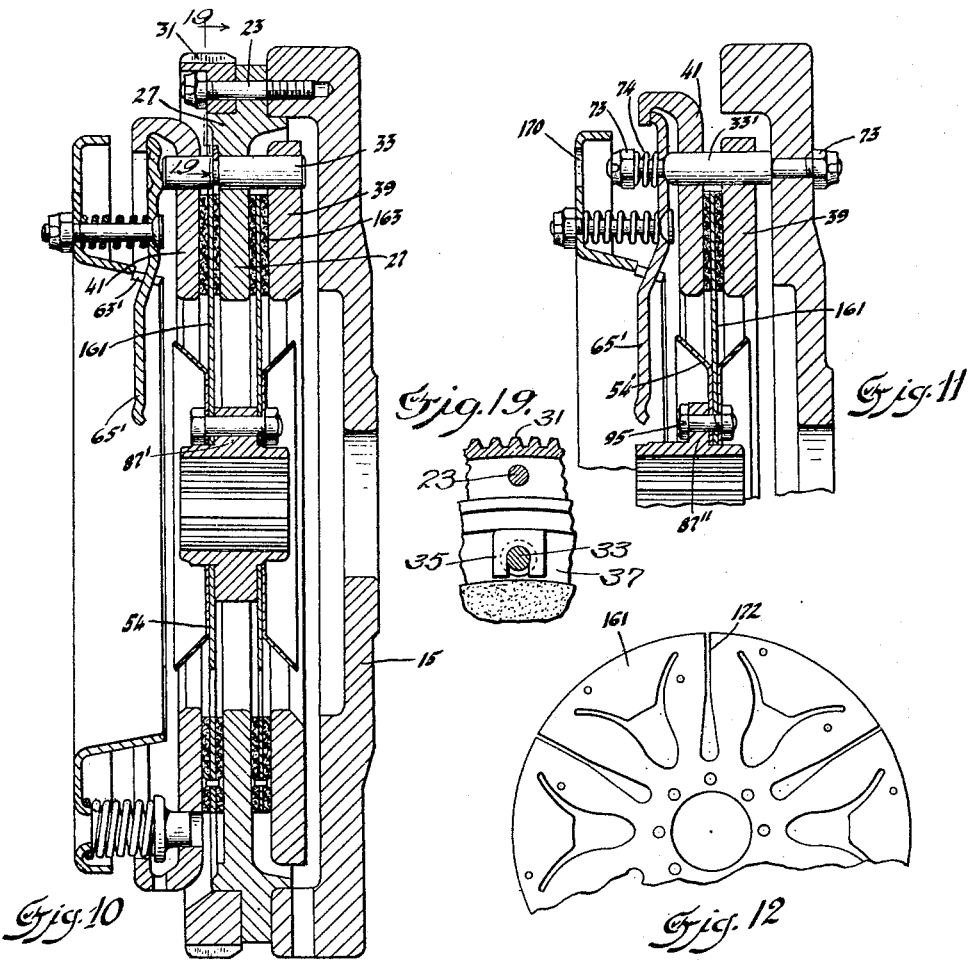
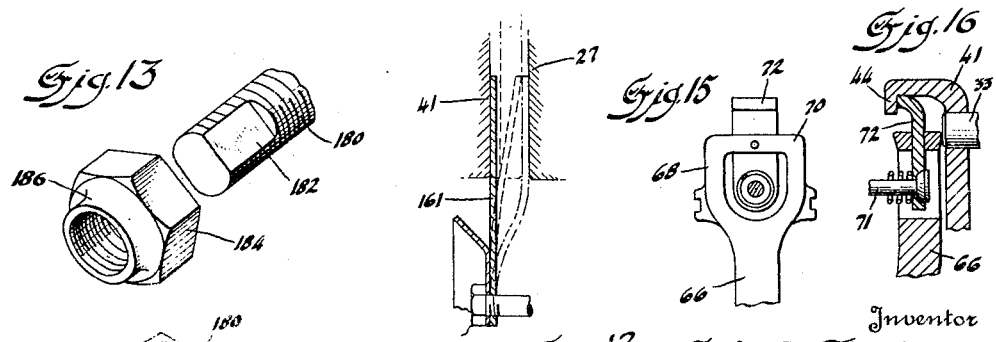

Patented June 24, 1930

1,768,346

UNITED STATES PATENT OFFICE

EARL A. THOMPSON, OF DETROIT, MICHIGAN, ASSIGNOR TO GENERAL MOTORS CORPORATION, OF DETROIT, MICHIGAN, A CORPORATION OF DELAWARE

DISK CLUTCH

Application filed June 20, 1927. Serial No. 200,228.

This invention relates to clutches. It has been designed primarily as an improvement in disk clutches for use in motor vehicles between the motor and the variable speed transmission.

Among the objects of the invention are the provision of equalized pressure upon opposite wear surfaces of one of the clutch members; a positive release for the movable clutch plates whereby any tendency to drag is eliminated; a very simple arrangement for assembly and disassembly, for the purpose of inspection, repair and replacement of parts. The clutch also aims to provide adequate arrangements for cooling. Associated with these objects are such important objects as economy in manufacture, efficiency in operation and reduction in weight of the driven parts, which latter is of particular importance in improving gear shifting.

Other objects and advantages will appear from a reading of the specification and an examination of the accompanying drawing.

In the drawing:

Figure 2 is a sectional view taken on line 2—2 of Figure 1.

Figure 3 is a section on line 3—3 of Figure 1.

Figure 6 is a view corresponding to Figure 3 but illustrating certain modifications.

Figure 9 is a longitudinal section through a modified form of throw-out device used with the construction shown in Figure 6.

Figure 10 is a section corresponding to Figure 2, showing a modification making use of steel driven plates.

Figure 11 is a view corresponding to Figure 2 but showing a modification for use with the single driven steel plate.

Figure 12 is a view in elevation of a steel plate which I prefer to use as the driven disks in the form of invention shown in Figure 10 and Figure 11.

Figure 13 shows in perspective a threaded stud and nut which is used with my improved clutch.

Figure 14 is an end elevation of the nut shown in Figure 13, the view showing the nut locked to its stud.

Figure 15 is a view in elevation of a modified form of actuating lever.

Figure 16 is a longitudinal section through the same.

Figure 17 is a diagrammatic view showing the operation of the parts in Figure 10.

Figure 18 is a sectional view of a modified detail.

Figure 19 illustrates a detail as seen from line 19—19 on Figure 10.

Figure 1:
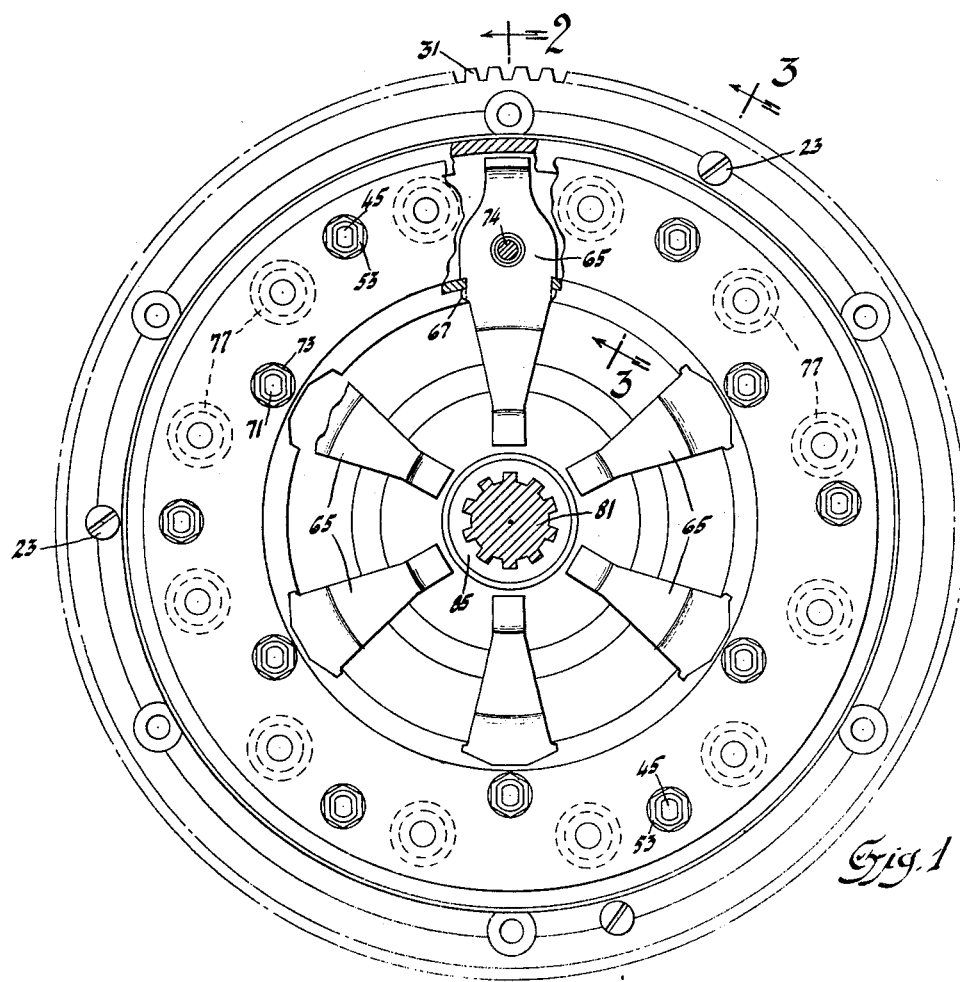
Figure 1 is a view in elevation of my improved clutch.

Referring by reference characters to Figures 1 to 4 inclusive, numeral 15 designates a fly wheel secured by bolts 17 to a flange 19 on a motor shaft 21. Bolts 23 enter an axially extended portion 25 of the fly wheel 15 and secure thereto an annular driving plate 27. The same fastening means secures in an outer annular recess 29 of said driving disk a gear 31 which is intended for engagement with the pinion of the starting motor in a manner well understood in the art.

The driving plate or disk 27 is formed with parallel faces on its opposite sides for frictional engagement in the clutch action. Press fitted into the driving disk 27 is an annular series of pins 33. Each of these pins has an annular groove to receive a U washer 35 fitted in a recess 37 of the plate 27 to thereby prevent the movement of the pin axially through the plate 27 when under the pressure of the clutch release levers, as will be explained. The outer end of the pin has its face parallel with the faces of the driving disk 27. An inner driving plate 39, annular in form, has openings by which it is given an axial sliding fit on pins 33.

The inner face of the driving plate 39 is intended to be parallel with the faces of driving plate 27. Similarly slidably mounted on pins 33 and located on the opposite side of driving plate 27 is an outer driving plate 41. This plate 41 has its outer circumferential portion inturned as at 43 with its face 44 carefully constructed to be parallel with the faces of the driving plate and with the ends of pins 33.

An annular series of studs or tie rods 45 (see Figure 3) pass through the driving plates. Enlargements 47 and nuts 49 hold the inner driving plate 39 to said studs, and enlargements 51 and nuts 53, also on said studs 45, hold a spring pressure plate 55 at the other and outer ends of said studs. The inner driving plate 39 is therefore maintained in rigid relationship with the spring pressure plate 55. This spring pressure plate 55 is composed of an annular portion 57, an outer peripheral, inwardly directed portion 59 and an inwardly directed inner portion 61. The latter is slotted as at 63 for a purpose to be described.

A plurality of levers 65 pass through the slots in portion 61 as shown in Figure 2. The levers are formed with notched portions 67 on their opposite edges to engage the edges of slots 63 to thereby aid in the guidance of the levers in their movements. The levers 65 engage at their outer extremities in the inturned hooked portion 44 of the outer driving plate. Inwardly of these outer ends the levers are in abutment with the ends of pins 33, which thus serve as fixed fulcrums for the several levers. The inner ends of the levers are to be engaged by a slidable throwout device, as shown in Figure 2. Inwardly from the fulcrums of the several levers there are associated with the levers bolts 71. The bolts may pass through openings in the levers and engage the several levers by their enlarged heads, as illustrated in the figure. The bolts 71 extend through the spring pressure plate 55 and at their outer ends have adjustably secured thereto nuts 73. Surrounding the bolts 71 between the levers 65 and spring pressure plate 55 there are positioned coil springs 74 which serve the purpose of holding the levers upon their several fulcrum pins 33 and prevent rattling. It should be noted that the distance from the fulcrum engagement with pins 33 to the engaging surface 44 is the same as the distance from the fulcrums to the center of bolts 71.

An annular series of openings 75 in the outer driving plate 41 is provided to receive a series of metal cups 76. These cups are flared outwardly to receive the inner ends of springs 77. Springs 77 engage the spring pressure plate 55 and are positioned relatively to said plate by inturned projections 79 which may be conveniently formed by stamping.

The driven shaft is designated by numeral 81. It may be piloted within the open end of the driving shaft as at 83, where suitable bearings 84 are made use of to provide an anti-friction support between the shafts. Splined on the driven shaft is a hub 85 having an annular radial projection 87. This projection 87 is to be positioned substantially in radial alignment with the driving disk 27 but is, as shown, of somewhat less thickness than said driving disk. Mounted upon shoulders formed on the hub between its central portion and its radial flange, one on each side of the flange, are the driven clutch plates 89. These clutch plates or disks are preferably of fibrous material and I prefer that they be impregnated with a friction material composed of rubber and other ingredients which shall serve the purpose of lubrication; which shall also control the coefficient of friction; and which shall bind the fibres together.

The material for the disks is preferably a mixture of fibres of asbestos and of cotton woven around a small brass wire to make a strand; these strands are then woven into cloth. Several layers of this cloth, sufficient to make a disk of the desired thickness are bound together by the above mentioned friction material and molded into the required shape.

One advantage of such a disk is the fact that it is not subject to distortion as the result of heat as is a metal plate and that it will readily accommodate for conditions of misalignment between the crankshaft and the transmission shaft. It will also readily conform to the surface shape of the driving plates should such plates become dished or otherwise distorted as the result of heat or from other causes.

Should the disk, when installed lack the flatness necessary to conform to the driving plates to obtain free release, this flatness will be obtained by a sort of ironing out process after a few operations of the clutch.

It may be found preferable to subject the frictional engaging parts of the fabric disk to a different heat treatment than that given the inner portions of the disks. The heat treatment of the frictional engaging parts should be calculated to give this portion of the disks the most desirable qualities for affording frictional engagement with the driving disks, while the treatment of the inner portion should be such as to give maximum strength and flexibility. To that end, after the disk is molded and formed and otherwise in condition for use the outer ring portion (that portion which is to be subjected to friction between the driving plates) may be given further heat treatment at a temperature sufficient to drive out the rubber, and other organic material which can be readily burned, leaving the inner ring portion at its maximum strength and flexibility. This has the further advantage that disagreeable odors arising from high heating of the rubber when the clutch is in use are avoided.

Between each driven disk and the annular projection are preferably located two spring plates of unequal radii. An inner plate 91 is located adjacent the hub projection and an outer plate 93 is located adjacent the fibre clutch disk. It may be explained at this point that the total width of the hub flange and plates is greater than disk 27 and that the plates 91 and 93 have a sufficient degree of resiliency to separate the fibre driven disks 89 from the driving disk 27 when the driving members 39 and 41 are axially moved away from each other. Flared plates 94 engage the outer faces of the fabric clutch disks and fastening means 95 are used to hold the several parts, the clutch disks 89, the spring plates and the flared plates 94 assembled upon the hub. The purpose of the flared plates is, as will be readily understood, to prevent oil from the throwout bearing reaching the clutch engaging faces. It will be seen from inspection of Figure 2 that the driven clutch disks 89 engage the driving plate 27 on their adjacent faces and that their remote faces are to be engaged by the axially movable driving plates 39 and 41.

Another advantage of a clutch built up as described is that the heat received by the driving members is readily transmitted from the clutch since these members are exposed to the air.

For operating the levers 65 I provide a throwout collar 97 which is slidable on a sleeve 99, the latter fixed in position as by being integral with or secured to a cover member not shown in Figure 2 but shown in Figure 9 and there designated by reference character 100. The said sleeve 99 surrounds but is out of contact with the driven shaft. Collar 97 is formed on its inner side with a channel portion 101 between its two bearing portions 103. At its end adjacent the levers it is provided with a ball bearing 105, the inner race 107 of which is carried by the collar and the outer race 108 of which engages the several levers 65. An oil guard 109 engages the outer bearing race and by means of a flange 111 it engages a portion of the collar 97. Oil is supplied at an opening 113, in which may be placed, if desired, a dust excluding felt, a duct 115 leading into the before mentioned channel, and a duct 117 communicating with the bearing. An oil grove 119 may be provided to prevent the oil reaching the vicinity of the bearing from working back and escaping out around the flanged portion 111 of the oil guard 109. The collar may be moved along its sleeve by any suitable operating means engaging pads provided on the collar.

The operation may be briefly described as follows. Springs 77 normally push the outer driving plate against the outer driven plate 89, thus holding the driven plate 89 between the plate 41 and plate 27. These springs also, through their engagement with the pressure plate and through the tie bolts 45, pull the inner driving plate 39 against the driven plate 89 causing a frictional grip of the driven plate 89 between plate 39 and plate 27. These springs 77 distributed circumferentially about the clutch insure equal pressure at all times upon opposite sides of the driving plate 27. When the clutch is to be released inward movement of the collar upon the sleeve causes levers 65 to fulcrum on the pins 33. The outer ends of the levers then positively push the outer plate axially away from the plate 27. The levers simultaneously pull upon the pressure plate through the agency of the bolts 71, and the latter by means of the tie bolts 45 positively move the inner plate 39 axially away from the driving plate 27. The spring members 91 and 93 thereupon serve to push the fibre clutch disks away from the driving plate 27. In the act of clutch release the pressure upon the studs by the levers is prevented from moving the studs through the openings in the plate 27 by the presence of the washers 35 fitted in the grooves of the pins 33 and engaging the recess in plate 27. The springs 74 serve at all times to hold the levers upon their fulcrum pins 33 and prevent rattling.

It should be observed that the faces of the driving plates 27, 39 and 41 are parallel to each other, and to the lever engaging face 44 formed on the outer plate 41. They are also parallel with the engaging fulcrum surfaces of pins 33. The springs 77 are so distributed about the clutch that the outer and inner plates are substantially simultaneously brought into frictional engagement. Since the points of engagement of the levers with the surface 44 of plate 41 and with the bolts 71 are at equal distances from the fulcrum points of the levers, the levers function to act equally in releasing and engaging the clutch plates. However, while the release action on plate 41 is direct, the release action on plate 39 is indirect, being had through bolts 71, pressure plate 55 and tie bolts 45. Limitations in manufacture render it almost impossible to secure as perfect a release of plate 39 as of plate 41 without some provision being made for adjustment. For example, irregularities in the stamped plate through the circumferential portion 57 may interfere with the simultaneous release of all parts of plate 39. This necessary adjustment is obtained by the use of nuts 73. In practice the assembled clutch is set up so that it may be rotated and movement indicating devices are applied to the inner plate 39 and to the outer plate 41 adjacent the points of lever action. Pressure is then applied to the release levers to give a desired reading to the indicator used with the outer plate. An adjustment of nut 73 is then made to give an equal reading on the indicator applied to plate 39. Similar adjustments may be made throughout the circumference of the disks whereupon there is assured an equal action of release at both sides of the driving plate 27.

Another factor which adds to the smoothness of operation is the provision of a certain degree of resiliency in the levers themselves. This resiliency acts to an extent against the resiliency of the clutch actuating springs 77. As the clutch members are being allowed to engage under the action of spring 77, the spring levers 65 are exercising their resilient characteristics to hold the plates apart until the last stage of movement of the collar 97 when the resiliency of the levers is released. In this way the engagement of the clutch is very gradually accomplished and an exceedingly smooth clutch action results.

In Figures 15 and 16 I have shown a modified form of releasing lever. In this form the levers are made not as resilient stampings but as forgings. These levers designated by numerals 66 have forked ends 68 terminating in a cross member 70. Secured to the cross member 70 is the middle point of a resilient plate 72, one end of which is to engage the hooked end 44 of the outer plate 41 and the other end of which is arranged for engagement with the bolt 71. The levers fulcrum on pins 33 as before. In this form it will be observed that there is an independent resilient action upon each of the driving clutch plates 41 and 39, independent for the reason that there is a middle point of the resilient member 72 which is fixed to the lever 66.

In the case where the levers are resilient and also in the second form where they are rigid and carry resilient plates 72 it should be observed that the lever is positively fulcrumed on pins 33 and that the equalized action upon the two plates 39 and 41 is obtained through the floating spring pressure plate. It is believed to be impossible to secure this desired result by levers which float and have no fixed fulcrum. Another feature of importance which may be noted is that the resilient clutch actuating springs apply the clutch substantially directly and not through the releasing mechanism.

Figure 5:
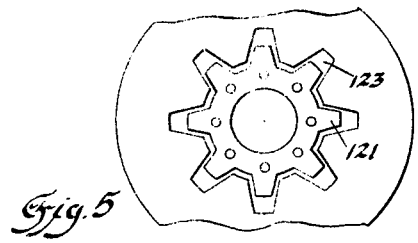
Figure 5 is a view similar to that of Figure 4, showing a modified form of spring plate.

In Figure 5 there is shown a slightly modified form of spring releasing plate for use with the fibre disks. In this form the plates corresponding to plates 91 and 93 are fingered plates 121 and 123. These plates are positioned in the same relation to the parts with which they operate as before. It will be understood that other shapes of releasing spring plates may be used, if desired.

In Figure 6 is shown a modified form of the expedient for insuring the separation of the driven plates or disks from the driving member 27 when the clutch is released. In this form of the invention stiffening rings 125 are secured upon the remote faces of the fibre disks by the fastening means 95 which is used to secure the fibre disks to the radial enlargement of the hub 85'. Between the fibre disks is a releasing spring plate 127. This plate is best shown by the detail view in Figure 7. It may be riveted to one of the plates as at 129 and its free end may lie flat against the other disk.

Figure 7:
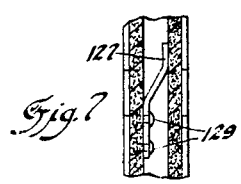
Figure 7 is a section detail of a part shown on Figure 6, the section being on the line 7—7 of Figure 6.
Figure 8:
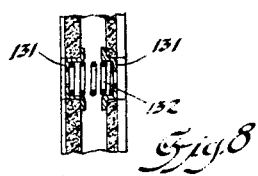
Figure 8 is a view corresponding to Figure 7 but showing a modification.
Figure 4:
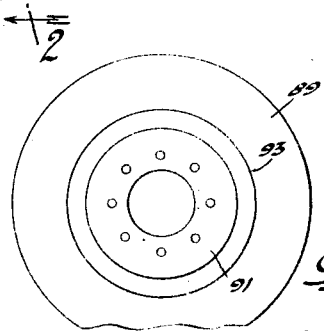
Figure 4 is a view in elevation of one of the driven disks showing the spring plates associated therewith.

As a substitute for the releasing device shown in Figure 2 and for that shown in Figure 7 there may be employed the arrangement shown by Figure 8. In this form cups 131 may be inserted in openings provided therefor in the fibre disks and coil springs 132 may be placed between said cups and tend normally to separate the fibre disks, the one from the other.

Figure 9 associated with Figure 6 shows a modified form of clutch throwout device. In this form the spring pressure plate 55' is annular in form and lacks the inwardly directed portion 61 of the form already described. The outer plate 41' is extended inwardly to a position adjacent the driven shaft where it slidably receives and pilots a sleeve 135. It will be observed that this sleeve 135 is arranged around but out of contact with the driven shaft. At its other end sleeve 135 is piloted within the clutch releasing bearing member 137 shown in Figure 9. This bearing member 137 is slidably but non-rotatably mounted in the transmission housing 139. A shaft 141 is mounted to rock within the transmission housing and is provided with arms 143 which engage pads 145 on the bearing or collar 137. Reciprocation of the bearing 137 effects by its engagement with sleeve 135 a reciprocation of the latter. The sleeve carries an oil guard 147 within a cover member 100 secured by bolts 151 to the transmission casing. Oil holes and passages 153, 155, 157 serve to lubricate the sliding and thrust surfaces of the bearing member 137 with the end of the sliding sleeve 135. The sleeve is formed with a flange 159 having notches which engage the several throwout levers as shown in Figure 6.

For the purpose of disassembly to inspect, replace or repair parts fastening means 23 permit the removal of the entire combined clutch assembly, as will be readily seen from an inspection of Figure 2. After the removal of the combined assembly from the driven shaft (the hub portion 85 sliding on the splined shaft portion), the combined assembly may then be converted into two sub-assemblies. This is accomplished by removing the nuts 49 from tie rods 45 to permit the separation of the parts to the left of the driving plate 27 from said plate. As said nuts are removed springs 77 push the outer plate 41 against the enlargements 47. One sub-assembly is thus made up of the pressure plate 55 and the outer plate 41 together with the bolts, springs, levers, etc. The other sub-assembly comprises the driving plate 27, the driven plates 89, together with the hub 85, and the inner plate 39, which latter is readily removable owing to its slidable mounting on pins 33. The driven members 89 may thus be removed and replaced by others without disturbing the spring assembly. Further disassembly of these sub-assemblies may be had in a manner which will be obvious. Reassembly will be had by reversing the steps of disassembling and is equally simple. These arrangements for assembly and disassembly are believed to be quite unique and to add very materially to the advantages of this novel clutch.

It is desirable that provision be made to insure assembly with the parts in predetermined relation. This is accomplished by providing an irregular spacing circumferentially of the tie rods 45. This space between two of such rods may differ from that between any two others. This will prevent the assembly except with the parts in a predetermined position. This is desirable in order to maintain a condition of balance inherent in the structure when the parts are so assembled in this predetermined relation. Such a balanced relation might be absent were the parts otherwise assembled.

Figures 10, 11 and 12 illustrate forms of clutches of this general kind wherein steel driven plates are used instead of the fibre disks previously described and at present believed to be preferred.

In Figure 10 is shown a form which very closely resembles the fibre disc type of clutch already described in that it embodies two driven disks 161 secured to a flange 87'. The disks 161 have linings 163 on their opposite faces to engage the driving plate 27 and the movable driving plates 41 and 39. The oil guards 54 are used as before, but owing to the inherent resilient characteristics of the disks 161 the spacing plates 91 and 93 or their equivalents shown in Figures 7 and 8 are omitted. In other respects this form of the invention substantially resembles the form already described. One other difference may be noted. The levers 65' are straightened, their inner ends lying nearer the clutch plates. This also means that the slots 63' are not so deep, being cut to a lesser extent into the spring pressure plate. In many plate clutches the hub carrying the driven plate or plates must slide on the splined portion of the driven shaft. In my clutch such sliding is not intended to occur. The movements of the opposed driving plates and the release action of the springs 91 and 93 engaging the fibre disks in the first embodiment described and the resilient characteristics of the driven disks in the second described form of invention insure clutch release without any sliding movement of the hub carrying the driven disks.

In Figure 11 the modification involving a steel driven disk is carried a step further and is shown as embodied in a clutch with but a single driven plate. In this form of the invention there are certain modifications of the parts. The hub flange 87'' carries the flared oil guards 54' and between them a single driven clutch plate 161. The bolts 95 secure the flared oil guards and single plate on one side of the part 87''. The single plate 161 with its friction disks on opposite faces of its peripheral portion is engaged between plates 39 and 41, the driving plate 27, of the forms previously described, being omitted. The pressure plate 55, the levers 65', the bolts, springs and adjusting nuts are substantially as hereinbefore described. A difference is made necessary in the fulcrum pin and the associated parts owing to the omission of the driving disk 27. The equivalent of pin 33 is indicated by reference character 33'. It is carried by the fly wheel and held thereto by a nut 73. The pin 33' has secured thereto or integral therewith a projection extending beyond the portion upon which is fulcrumed the lever 65'. An adjusting nut 73 and spring 74 are carried upon and around the projection of pin 33'. It will be seen that in the construction thus provided the complete assembly is removed upon the removal of nuts 73 upon the extremity of pins 33', accessibility to which nuts 73 is made by providing openings 170 in spring pressure plate 55. Thereafter, the subassembly may be separated by means of the equivalents for the bolts and nuts of the other form.

The plate which I prefer to use in the form of invention shown by Figures 10 and 11 and which possesses certain particular advantages in connection with the form of invention shown by Figure 10 is illustrated in Figure 12. This plate has symmetrically disposed radial slots 172 extending from the periphery of the plate inwardly to a point comparatively near the central opening. These slots may, if preferred and as in the figure, be transversely enlarged inwardly, the enlargement slightly increasing as the slots approach their inner end. Just beyond the central opening are shown the holes for the fastening bolts, and on the peripheral segmental portions between the slots are shown the holes for securing on opposite surfaces the frictional linings. Between the radial slots the material of the plate is cut out substantially as shown. From a point radially equal to the inner end of the slots and midway between the slots the material is cut away to form an opening of circumferentially increasing dimension to a point near the inward margin of the segmental portion. From this outer region of the cutout portion the opening is prolonged by slots which diverge and extend into the segmental portions toward the beforementioned radial slots. The utility of this sort of plate is to be found more especially when used in the form of invention shown by Figure 10, but it is my intention to use such a plate in the form shown by Figure 11 also.

In Figure 17 I have shown a diagram to better explain what is to be accomplished by a plate of this kind. The figure is to be examined in connection with Figure 10. It will be observed that the hub flange 87' of Figure 10 is of greater thickness than the driving plate 27. As explained above this will enable the driven plates to separate from the driving disk when the driving plates 39 and 41 are axially moved away from plate 27. In the act of clutch engagement as the plate 41 approaches plate 27 it contacts the resilient plate and bends it from its hub to the inner margin of its segmental portion (see Figure 17). This bending is made possible and rendered easier by the provision of the slots and also by the removal of the material between the slots. The bending continues until the outer peripheral edge of the resilient plate engages the driving plate 27. A second and greater effort in clutch application is then required to flatten the segmental portion between plates 41 and 27. By so flattening the segmental portion the portion of the plate inwardly of the segmental portion must be given a reverse bend owing to the greater thickness of part 87' as compared with 27. There are thus two stages in the clutch action, the first of which bends the disk or plate until its outer periphery engages plate 27 and the second stage in which the segmental portion is flattened and a reverse bend given to the inner portion. I have found that by carrying the radial slots well in from the periphery and by cutting away material between the said slots as shown in Figure 12 I am able to effect both the first and the second bending stages without unduly heavy spring pressure and the cutting away of material has been made in such a way as to produce no one weak spot where stresses are localized and as a result of which the plate would tend to break when the secondary reverse bend is given that part of the plate within the clutch engaging segment. It will be seen, therefore, that the secondary bending may be made with no danger of breaking the plate. It is my belief that in prior plate constructions, clutch plates have been made to render possible and easy the movement which I have described above as the primary bending. This appears to have been done by slotting and by the removal of material. As far as I am aware, however, no provision has been made to accommodate this secondary action. In some constructions a secondary bending would appear to require a very considerable pressure action as where reliance for resiliency of the plate was placed upon slots alone and in others a secondary action would greatly endanger plate breakage in that a line of extreme weakness is present just within the segmental friction surface. I do not wish it understood that the provision for secondary bending can be had only by the specific way in which the material has been cut out in the embodiment shown by Figure 12, but I would have it understood that various modified types could be formed provided the material be so removed as to permit the first bending to take place under minimum pressure and the secondary bending wherein the removal of material is so made as to avoid any danger of breaking the plate.

In Figures 13 and 14 is shown a very convenient means of securing an adjusting nut. I have found it desirable to use such a nut in several places in my clutch. It is shown for example on bolts 71. It is also used on tie bolts 45, and it may be used wherever it is desired to retain a nut in adjusted position. It is of particular advantage, of course, where a very fine adjustment of the position of the nut on a stud or bolt is desired and where means must be provided for securing the nut in that position of adjustment. Referring to Figures 13 and 14 there is illustrated a threaded stud or bolt 180. At the end of this bolt are oppositely located flats 182. A nut is shown at 184 threaded for engagement with the stud or bolt, and it may be turned upon the stud to any desired position of adjustment. The nut is formed with a circular extension 186 having comparatively thin walls. As the nut reaches its position of adjustment the thin wall portion may be flattened against the flats 182, the thin walled portion thus taking the form shown in Figure 14 and serving the purpose of a lock for the nut. Should it be desired to change the adjustment of the nut the application of a suitable wrench will turn the nut and the flattened portion will again assume a circular form. After readjustment of the nut the extension 186 may then be flattened to engage the flattened portions 182 and again hold the nut in a desired position of adjustment. I have found this a very simple and effective means of securing the adjusting nuts in position.

In Figure 18 is shown a modification of the inner driving plate. As a result of tests it is found that under severe clutch action an annular plate of uniform thickness becomes hotter in the region of lesser radius than at the outer peripheral portion. To offset this unequal heating condition and to insure an equality of temperature throughout the plate at all radial positions it is proposed to thicken the inner plate 39' adjacent flywheel 15' at the portion of smaller radius. This is clearly shown in Figure 18. By this means there is a greater volume of material to absorb a greater absolute quantity of heat and to thereby secure an equal temperature throughout the plate. This modification in the plate avoids any possibility of cracking. The refinement which is shown as applied to the inner plate may also be adopted in the case of the outer plate, but it is not regarded as at all necessary. The outer plate is better located for cooling and is in a position to more readily radiate excessive heat at any portion. For this reason it is not intended that the outer plate shall be shaped as in this modified form.

I claim:

1. In a clutch, a primary driving member, axially movable driving members positioned on either side thereof and rotatable therewith, a driven member comprising parts positioned between said primary driving member and said axially movable driving members yielding means, and means associated therewith to exert equal pressures upon said axially movable members to effect clutch engagement.

2. In a clutch, a driving member, members carried thereby and rotatable therewith and each movably mounted for movement toward and from the other, a driven member positioned between said movable members, operating means operatively connected to each of said movable members to positively move both said members and effect their separation, and yieldable means independent of said operating means to move said movable members toward each other said operating means including an axially movable pressure plate adjacent one of said movable members, means connected to said pressure plate and to the remote movable member, the said yieldable means being positioned between said axially movable pressure plate and the adjacent movable member.

3. In a clutch, a driving plate, plates slidable toward and from each other, non-rotatably mounted relative to said driving plate and one on each side thereof, tie rods extending through said driving plate, a pressure plate connected to said tie rods at one end thereof, the remote sliding plate connected to the other ends of said tie rods, driven plates between said sliding plates, means to move said sliding plates and yielding means between said pressure plate and the adjacent slidable plate to effect clutch engagement.

4. In a clutch, a driving plate, concentric axially movable relatively nonrotatable plates one on each side of said driving plate, driven members positioned between opposite faces of the driving plate and adjacent faces of the axially movable plates, resilient means to effect clutch engagement, manually operable means to separate said axially movable plates, and other resilient means to thereafter separate said driven members from said driving plate.

5. In a clutch, a driving plate, axially movable relatively nonrotatable plates associated therewith, driven members positioned between opposite faces of the driving plate and adjacent faces of the axially movable plates, means to separate said axially movable plates and resilient means to thereafter separate said driven members from said driving plate, said resilient means consisting of resilient plates centrally secured and peripherally engaging the inner surfaces of said driven members.

6. In a clutch, a driving member, pins carried thereby, a pair of relatively nonrotatable axially movable members slidable on said pins, a driven member between said slidable members, a spring pressure plate, springs between said pressure plate and the adjacent one of said axially movable members, and a positive connection between said pressure plate and the remote slidable member.

7. The invention defined by claim 6 together with levers fulcrumed on said pins engaging said adjacent movable plate, and means connecting said levers and pressure plate.

8. The invention defined by claim 6 together with levers fulcrumed on said pins, engaging said adjacent movable plate, means connecting said levers and pressure plate, and cooperating parts on said pressure plate and levers for guiding the latter.

9. The invention defined by claim 6 together with levers fulcrumed on said pins, engaging said adjacent movable plate, means connecting said levers and pressure plate formed with slots for the passage of said levers and said levers formed with notches to engage the edges of said slots for the guidance of the latter.

10. In a clutch, driving and driven members, one of said members including a rotatable member, parts axially movable toward each other to clutch engaging position and away from each other to clutch releasing position, resilient means to effect one of said movements, levers pivotally engaging a fulcrum fixed relative to said rotatable member to effect the reverse movement, said rotatable member being positioned between said axially movable parts, the driven member engaging opposite faces thereof and adjacent faces of said axially movable parts.

11. In a clutch, a rotatable member, driving members non-rotatably mounted on said rotatable member, each slidably mounted relatively to the rotatable member and simultaneously movable toward each other in the act of clutch engagement, and away from each other for clutch release, one or more driven members between said driving members, a pressure plate outside one of said driving members, means positively connecting said pressure plate and the remote driving member, and resilient means between said pressure plate and the adjacent driving member.

12. In a clutch, a rotatable member, driving members nonrotatably mounted on said rotatable member, and slidable toward and from each other, one or more driven members between said driving members, a pressure plate outside one of said driving members, means positively connecting said pressure plate and the remote driving member, resilient means between said pressure plate and the adjacent driving member, fulcrum means carried by said rotatable member, lever means fulcrumed thereon, said lever means engaging one of said driving members, means connecting said pressure plate to a fixed point on said lever means, such that said two points of said lever means are equally distant from the lever fulcrum.

13. In a clutch, a rotatable member, driving members non-rotatably mounted on said rotatable member, and slidable toward and from each other, one or more driven members between said driving members, a pressure plate outside one of said driving members, means positively connecting said pressure plate and the remote driving member, resilient means between said pressure plate and the adjacent driving member, fulcrum means carried by said rotatable member, lever means fulcrumed thereon, said lever means engaging one of said driving members, means connecting said pressure plate to a fixed point on said lever means such that said two points of said lever means are equally distant from the lever fulcrum, together with anti-rattling spring means mounted on said last named means.

14. In a clutch, a rotatable driving member, fixed fulcrum pins carried thereby, secondary driving members mounted on said rotatable member to be rotated therewith and for simultaneous and opposite axial movement, one or more driven members positioned between said driving members, levers pivoted on said fulcrum pins and engaging directly one of said movable members, means positively connecting said levers to the other movable member, said last named means including a pressure plate, connections between said pressure plate and said levers and also between said pressure plate and the remote movable member, and means to adjust said connections.

15. In a clutch for motor vehicles, a fly wheel, fulcrum pins carried thereby, driving members slidable on said pins, one or more driven members positioned between and to be frictionally gripped by said driving members, levers having fixed fulcra on said pins, connections between said levers and the driving members whereby said driving members may be moved axially in opposite directions to release the clutch.

16. The invention defined by claim 15 together with resilient means to actuate said clutch, said levers also being resilient.

17. In a clutch, a driving member, a driven member having a hub portion and a face engaging said driving member, another driving member engaging the opposite face of said driven member, yielding means engaging the hub portion of said driven member and distorted by the movement of said driving and driven members into frictional engagement to thereby acquire a potential resiliency operable to space said driven member from the first driving member when the clutch is released.

18. A clutch assembly comprising two sub-assembles, means including a circumferential series of fastening means to secure the complete assembly to a rotating member, means including a series of studs having enlargements thereon to permit the separation of said clutch assembly into its two component sub-assemblies.

19. A clutch assembly comprising a first driving member, coaxially movable secondary driving members, one on each side thereof, driven members engaging opposite faces of said first driving member, a pressure plate, springs between said pressure plate and the adjacent axially movable secondary driving member, tie bolts between said pressure plate and said remote axially movable secondary driving member, said tie bolts having enlargements and terminal nuts positioning said remote slidable member, said enlargements engaging the adjacent slidable member upon the removal of said nuts to thereby permit the removal of a first sub-assembly.

20. In a clutch, a recessed rotatable member, driving members rotatable therewith, means to move said driving members in opposite axial directions, a driven member between and gripped by said driving members, one of said driving members being substantially housed within the recess of the rotatable member, said last-mentioned driving member being of greater thickness in its region of lesser radius.

21. In a clutch, a rotatable member, driving members non-rotatably mounted on said rotatable member, each slidably mounted relatively to the rotatable member and simultaneously movable toward each other in the act of clutch engagement, and away from each other for clutch release, one or more driven members between said driving members, a pressure plate outside one of said driving members, means positively connecting said pressure plate and the remote driving member, resilient means between said pressure plate and the adjacent driving member, and adjusting means associated with said connecting means to effect parallelism between said driving members.

In testimony whereof I affix my signature.

EARL A. THOMPSON.